Figure 1:
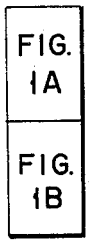
Figure 1A:
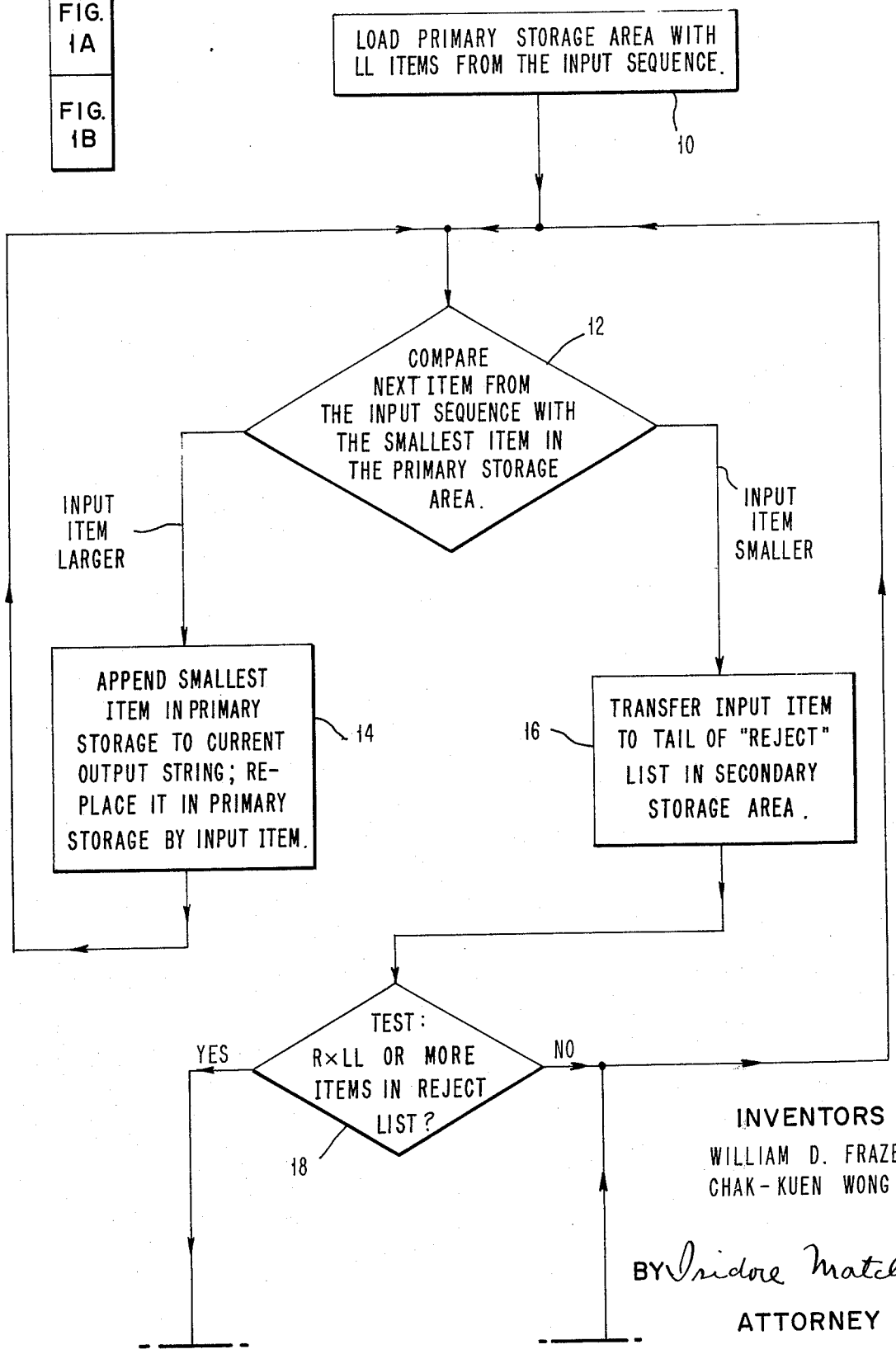
Figure 1B:
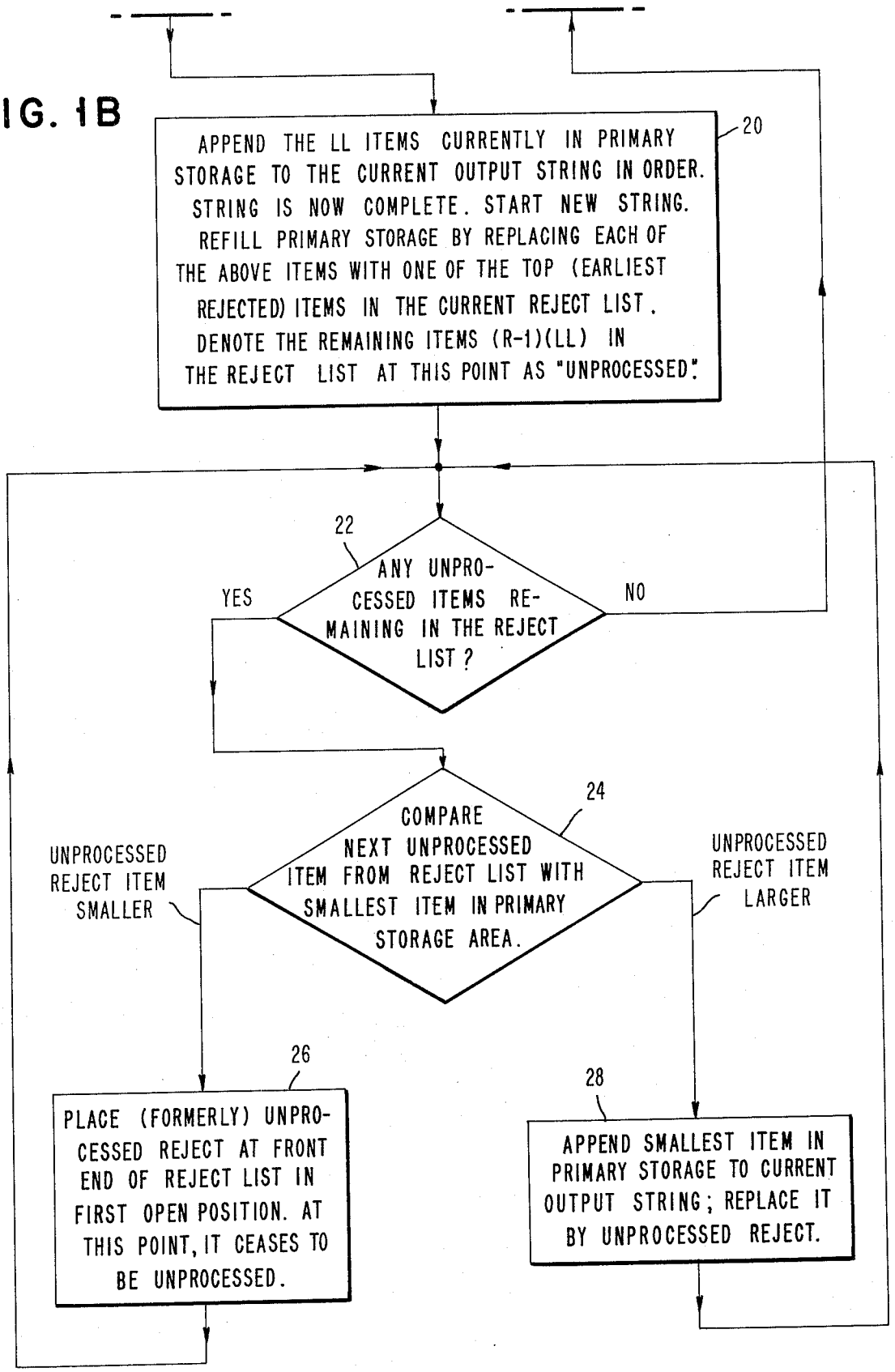
Figures 2, 2A, 2B:
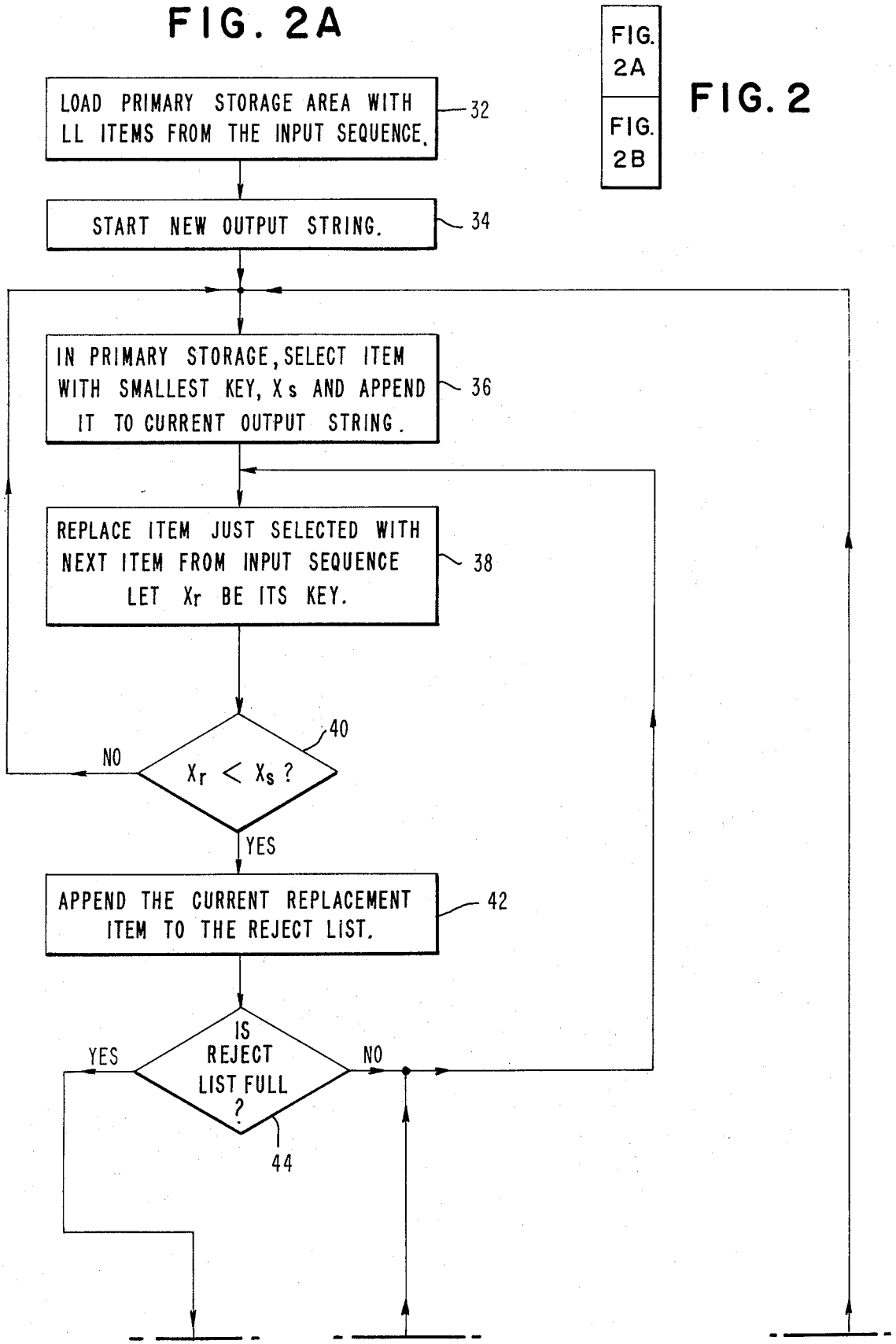
Figure 2B:
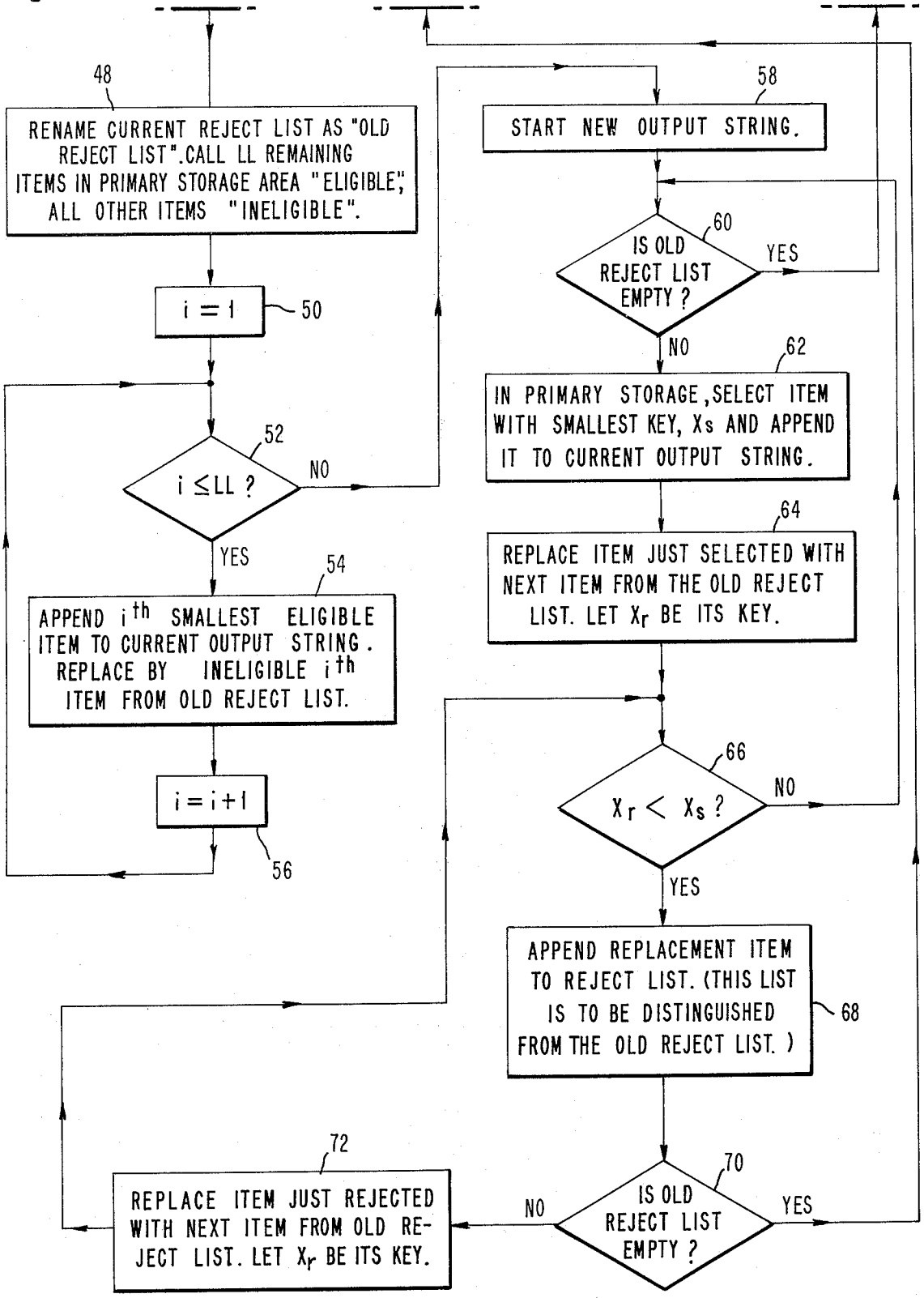

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED SEPTEMBER 2, 1975

938 O.G. 7

T938,007

INTERNAL SORT PROCESS

William D. Frazer, Briarcliff Manor, and Chak-Kuen Wong, Peekskill, N.Y., assignors to International Business Machines Corporation, Armonk, N.Y.

Continuation of application Ser. No. 103,085, Dec. 31, 1970. This application Jan. 18, 1974, Ser. No. 434,525

Int. Cl. G06f *7/22, 7/36*

U.S. Cl. 444—1

4 Sheets Drawing. 19 Pages Specification

A novel internal sort process is presented whereby, if the primary storage area made available for the sort has the value LL, there can be utilized a secondary storage area having the value RxLL in carrying out the sort. Given an input sequence of records to be sorted, the term LL denotes the number of records which can be accommodated in the available primary storage area and the term R is a multiplier of LL which can be selected by the user. In the process the secondary storage area of capacity RxLL records is employed to form a reject list. The reject list receives, in order, those items in the input sequence that are smaller than the items currently in primary storage up to its capacity of RxLL. Then, when the current output string can no longer be extended, the items in the reject list are first processed at the inception of the formation of the next output string before the next items in the input sequence are considered. This latter stage of the process will result in re-rejected items, but they eventually will find their way to an output string. Accordingly, with this process, there is enabled the production of strings whose lengths can be thereby increased, the degree of increase being dependent upon the selection of the value of the term R.

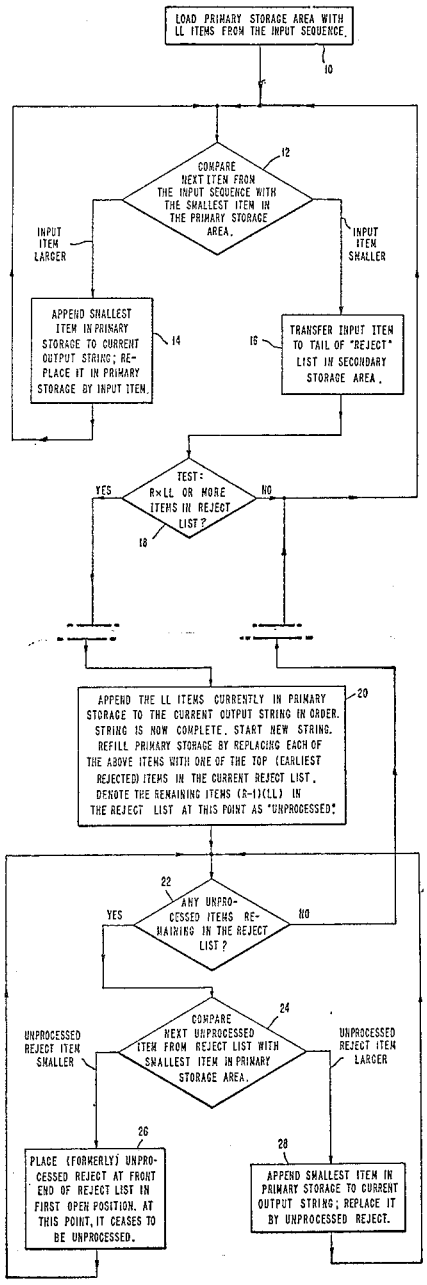

INTERNAL SORT PROCESS

Original Filed Dec. 31, 1970 4 Sheets-Sheet 1

INVENTORS
WILLIAM D. FRAZER
CHAK-KUEN WONG

BY Isidore Match
ATTORNEY